United States Patent Office 3,495,259
Patented Feb. 10, 1970

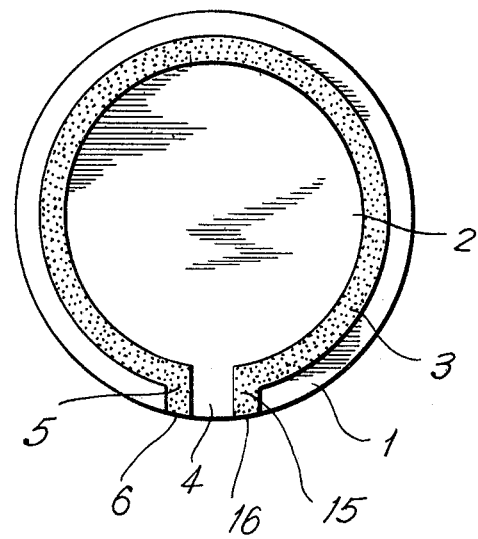

3,495,259
ELECTRICALLY HEATED OPTICAL DEVICE
Martin-Gottfried Rocholl, Heidelberg, Wolfgang Kriege, Leimen, Rainer Strietzel, Heidelberg, and August Hertel, Ziegelhausen, Germany, assignors to Eltro GmbH & Co., Heidelberg, Germany
Filed May 23, 1968, Ser. No. 731,601
Claims priority, application Germany, May 23, 1967,
E 25,212
Int. Cl. H05b 3/06
U.S. Cl. 219—522                    7 Claims

ABSTRACT OF THE DISCLOSURE

A heating system applied to the surface of an objective and/or the surface of a viewing lens to prevent condensation on such surface. The heating system is constituted as a heating conductor in the form of a metallic layer of ring shape with a narrow radial gap placed near the periphery of each surface and out of the optically active zone of the lens.

Brief summary of the invention

This invention relates to an electrical heating system for an optical element of an optical instrument and more particularly to such a heating system for the viewing windows or frontal lenses of optical instruments.

The use of optical instruments such as telescopes, viewing systems, sighting units, etc. in vehicles or aircraft often becomes difficult due to the condensation of moisture on the frontal optical element, whereby visibility is impaired. Such condensation or fogging occurs whenever the temperature of the optical equipment is lower than the dew point temperature of the humid ambient atmosphere. In this case, water condenses on the cooler surface, for example also on the frontal glass surface, or the lens of an optical viewer unit, which is colder than the ambient atmosphere. The condensation is usually in the form of small water droplets, which produce a strong omnidirectional refraction. If the formation of droplets is prevented, and the condensation is permitted to be deposited in a substantially uniform layer, this will impair the visibility to a much lesser degree and the observed object remains discernible. However, the presence of water films of varying thickness on the glass surface, which will act as small-angle prisms and also refract light, causes distortion of the perceived image.

Means are known, which will either, as mentioned before produce a uniform condensation deposit without formation of droplets, or effect absorption of moisture by the swelling of a plane-parallel layer of water absorbent material. Such means are inclusive of clear-view cloths impregnated with ethylene glycol or glycerine for the first effect and clear-view windows for gas masks provided with a thin, water-swelling layer of gelatin for the second effect. These means, however, are employed only in arrangements concerned with moisture condensation on the inside of optical elements e.g. auto windshields, gas-mask windows etc. In these cases the moisture condensation is caused by the additional supply of water vapor to a closed system, or by the increase of water vapor concentration inside such a system. For this purpose, the optical equipment is often internally equipped with "dry" cartridges, which maintain the water-vapor partial pressure at a very low level.

If, on the other hand, the cause of the condensation is produced by a sudden increase of the water vapor pressure together with a temperature rise outside the system, or if the temperature of the equipment lies below the dew point of the ambient atmosphere, then condensation will occur on the external surfaces. In these cases, the aforesaid known means for counteracting the formation of water droplets, are of little use because they are substantially water-soluble and subject to being washed away, for example by rain. Moreover, the wiping of the outer surfaces of the optical elements under consideration with a clear-view cloth very often is not possible or not practical on account of the nature of the utilization of the equipment in question. Moreover, this may leave undesirable wiping traces.

The present invention is directed to the production of an arrangement which will prevent the fogging or clouding of the external surfaces of emission windows, and even assure the drying of moist front viewing surfaces of optical equipment.

According to the invention, water condensation on the external optical surfaces is prevented by heating these glass elements to a temperature above the dew point of the humid ambient atmosphere. This is achieved by a heating conductor consisting of an extremely thin metal layer which is vapor-deposited, under high vacuum, onto the glass or quartz surface in the form of a ring concentric with the optical axis.

In order not to interfere with the optically useful area of the equipment or to impair its transmission capabilities or its homogeneity, the metal deposit layer is formed as a ring of only a few millimeters width, which is interrupted at one location by a narrow radial gap, the ring being placed in such a manner, that it concentrically surrounds the optically active zone of the window or lens.

The heat transmission to the carrier is enhanced by increasing the contact surface area between the electrically conductive heating metal layer and the carrier material of quartz or glass. For this reason, the metal layer is vapor-deposited under high vacuum onto the glass or quartz element.

The gap of the ring is of the order of several millimeters width. At this location, the metal surface includes radial projections extending to the edge or rim of the optical element. Each of these radial projections of the ring is connected to one of the terminals of a voltage source. For front surfaces of a certain size, the width, thickness and length of the metallic layer, to be deposited on the glass by vapor-vacuum techniques, are determined experimentally by the realization of the desired heating effect with the available voltage supply. The resistance necessary for the required heat output is measured during the vapor-vacuum treatment, either directly or by means of a thermal replica.

This manner of electrically heating the emission windows cannot be adapted with the same efficiency to diameters of any size, because the heating of the center zone of the front window occurs by heat conduction in the glass from the directly heated peripheral regions. On account of the temperature gradient between the heated periphery and the center region, an increase of the heating temperature may become necessary as the radius from the center to the peripheral heating layer increases.

Brief description of the drawing

The sole figure of the drawing is an end elevation view of an optical element.

Detailed description

In the drawing is seen an optical element having a peripheral region 1 whereat a thin metallic layer 3 of ring shape has been vapor-deposited under vacuum. The layer 3 concentrically surrounds the optically active area 2 of the optical element. The metallic ring 3 has a radial gap 4 at one location. Two radial projections 5, 15 extend outwards towards the outer rim of the optical element. At their ends, these radial projections are provided with connection terminals 6, 16 by means of which the ring is connected in a circuit with a power source.

The metallic layer 3 can be an adhesion layer of one or more base layers with a superimposed resistance layer of one or more noble metals. The layer 3 may also be an alloy or blend of base and noble metals. The composition of such alloys may be the same as that of heating resistance wire such as konstantan, manganin or the like.

An example will next be given of one embodiment of a metallic ring layer applied onto an optical element showing the efficacy thereof.

Example

A glass element of a diameter of 76 mm. and a thickness of 3 mm., was masked in the areas not to be metallized, and was subjected to a vapor deposition of an 8 mm. wide metallic ring (O.D. 66 mm., I.D. 58 mm.), consisting of manganese and gold, until a resistance value of 120 ohms was attained. The operating voltage of the unit was 24 volts. With a current flow of 0.2 amp the heat output was 4.8 watts at an ambient temperature of 20–22° C. and after an initial warmup period of 15–20 minutes, a thermally balanced state was attained in which the temperature of the heated ring was 55° C., and that of the optically active center region was 45° C. Over a testing period of 120 hours, these temperatures remained constant within narrow tolerances which resulted from minor variations of the ambient temperature.

What is claimed is:

1. A heated optical device comprising a substantially flat, transparent circular optical element having spaced opposite surfaces and a central, optically active zone, an electrical heating conductor in a form of a thin metallic layer deposited on one of said surfaces of the transparent element for heating thereof, said metallic layer being of a ring shape with a narrow radial gap, said ring shape layer being disposed in the region of but spaced from the periphery of said optical element and surrounding the central, optically active zone, said ring shape layer including radial projections bounding said gap and adapted for serving as connectors to an external voltage source.

2. A device as claimed in claim 1 wherein said layer is a vapor-deposit layer formed under high vacuum.

3. A device as claimed in claim 1 wherein said optical element is constituted of glass or quartz.

4. A device as claimed in claim 1 wherein said layer is an adhesion layer of at least one base layer with a superimposed resistance layer of at least one noble metal.

5. A device as claimed in claim 1 wherein said layer is an alloy or blend of base and noble metals.

6. A device as claimed in claim 1 wherein the composition of said metallic layer is that of alloys for heater resistance wire.

7. A device as claimed in claim 1 wherein said ring shape layer is concentric with said optical element.

References Cited

UNITED STATES PATENTS

| | | |
|---|---|---|
| 2,442,913 | 6/1948 | Abrams et al. |
| 2,557,983 | 6/1951 | Linder _____ 219—543 |
| 2,882,377 | 4/1959 | Rinehart _____ 219—543 X |
| 2,982,934 | 5/1961 | Browne _____ 338—323 |
| 3,027,561 | 4/1962 | Senne _____ 2—14 |
| 3,052,787 | 9/1962 | Williams _____ 350—61 X |
| 3,288,983 | 11/1966 | Lear _____ 219—522 |
| 3,343,985 | 9/1967 | Vickery _____ 338—308 X |

VOLDOYMYR Y. MAYEWSKY, Primary Examiner

U.S. Cl. X.R.

2—14; 219—203, 543; 338—308; 350—61, 253